US011182474B2

(12) United States Patent
Simpson et al.

(10) Patent No.: US 11,182,474 B2
(45) Date of Patent: Nov. 23, 2021

(54) COMMON SERVERLESS SECURITY API

(71) Applicant: VMware, Inc., Palo Alto, CA (US)

(72) Inventors: Glen R. Simpson, San Jose, CA (US); Demin Yan, Palo Alto, CA (US); Adith Sudhakar, Palo Alto, CA (US); Zohar Hirshfeld, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 332 days.

(21) Appl. No.: 16/256,985

(22) Filed: Jan. 24, 2019

(65) Prior Publication Data

US 2020/0242237 A1 Jul. 30, 2020

(51) Int. Cl.
| | |
|---|---|
| G06F 21/54 | (2013.01) |
| H04L 29/06 | (2006.01) |
| G06F 9/48 | (2006.01) |
| G06F 21/64 | (2013.01) |
| H04L 12/24 | (2006.01) |
| G06F 21/62 | (2013.01) |

(52) U.S. Cl.
CPC ............ *G06F 21/54* (2013.01); *G06F 9/4843* (2013.01); *G06F 21/6254* (2013.01); *G06F 21/64* (2013.01); *H04L 41/142* (2013.01); *H04L 63/1425* (2013.01); *H04L 63/20* (2013.01)

(58) Field of Classification Search
CPC ...... G06F 21/54; G06F 21/6254; G06F 21/64; G06F 9/4843; H04L 41/142; H04L 63/1425; H04L 63/20
USPC .......................................................... 726/26
See application file for complete search history.

(56) References Cited

U.S. PATENT DOCUMENTS

| | | | |
|---|---|---|---|
| 10,623,386 B1 * | 4/2020 | Bernat | H04L 9/0822 |
| 2019/0007458 A1 * | 1/2019 | Shulman | H04L 63/1433 |
| 2019/0034625 A1 * | 1/2019 | Ford | G06F 21/602 |
| 2019/0251279 A1 * | 8/2019 | Emberson | G06F 21/6218 |
| 2019/0312899 A1 * | 10/2019 | Shulman | H04L 63/1416 |
| 2020/0128036 A1 * | 4/2020 | Sarzynski | H04L 63/1433 |
| 2020/0137125 A1 * | 4/2020 | Patnala | H04L 63/20 |

OTHER PUBLICATIONS

Madhavapeddy et al., "An Architecture for Interspatial Communication", HotPOST 2018: Hot Topics in Pervasive Mobile and Online Social Networking 2018 IEEE (Year: 2018).*

(Continued)

*Primary Examiner* — Khalil Naghdali
(74) *Attorney, Agent, or Firm* — Loza & Loza, LLP

(57) ABSTRACT

System and method for executing a security operation for microservices/serverless function of a microservices-based/serverless application running on a physical infrastructure use a central security controller to execute the security operation for different microservices/serverless functions of the microservices-based/serverless application. Requests for the security operation are transmitted to the central security controller when communications are received at the different microservices/serverless functions of the microservices-based/serverless application. Results of the security operation are then received from the central security controller at the different microservices/serverless functions of the microservices-based/serverless application. Based on the results of the security operation, a task associated with the communications is executed at the different microservices/serverless functions.

20 Claims, 5 Drawing Sheets

(56) References Cited

OTHER PUBLICATIONS

Brooks et al., "A Failure to Communicate: Security Vulnerabilities in the GridStreamX Edgeware Application", 978-1-908320-20/9 2013 IEEE (Year: 2013).*
Hong et al., "Development of Smart Devices for Secure Communication in the SCADA system", 2011 International Conference on Computational Science and Its Applications, 2011 IEEE (Year: 2011).*
Vaquero et al., 2018 arXiv:1806.00764v2, "Research Challenges in Nextgen Service Orchestration" pp. 1-39 (Year: 2018).*

* cited by examiner

COMMON SERVERLESS SECURITY API

BACKGROUND

Serverless applications alleviate the need for developers to be concerned about the underlying infrastructure. Thus, developers no longer have to worry about whether there is sufficient resource capacity in the infrastructure or whether configuration of the infrastructure is current, such as security patches for servers. However, serverless applications present security challenges that are not found in conventional applications.

As serverless applications may be made up of a large number of small, discrete functions or microservices-based applications made up of a large number of microservices, there can be a lot more data on the move over the network in the underlying infrastructure. Also, the decoupling of the architecture components leads to the ability of development teams to have choices with respect to language, framework and data storage. There is also a tendency to push more code more quickly with less rigor. These factors create a larger potential attack surface in the amount of code that interprets input, which adds complexity to the endeavor of securing the application consistently.

One such challenge faced in securing serverless applications in the presence of a multitude of languages and frameworks is consistent input validation, data sanitization, and authorization security controls along with consistent visibility of the invocation of data ingress and egress activities in a security context.

BRIEF DESCRIPTION OF THE DRAWINGS

Throughout the description, similar reference numbers may be used to identify similar elements.

DETAILED DESCRIPTION

Figure 1:
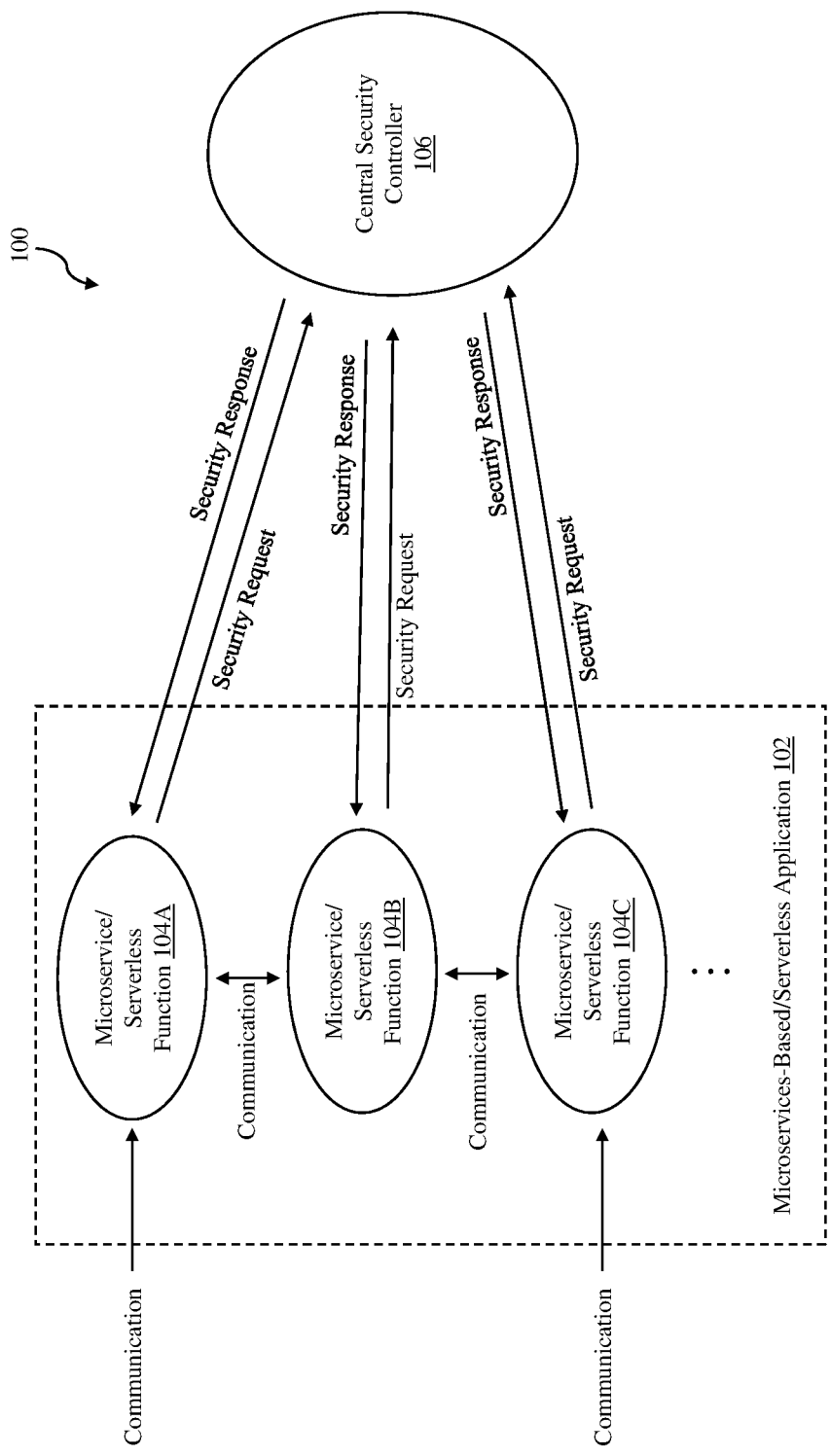
FIG. 1 is a block diagram of an application system in accordance with an embodiment of the invention.

FIG. 1 shows an application system 100 for centralized execution of security-related operations for microservices-based and/or serverless applications in accordance with an embodiment of the invention. The application system 100 includes at least one microservices-based or serverless ("microservices-based/serverless") application 102, which is comprised of a number of microservices or serverless functions ("microservices/serverless functions") 104 (e.g., microservices/serverless functions 104A, 104B and 104C), and a central security controller 106. As explained in more detail below, the application system 100 allows the microservices/serverless functions 104 of the microservices-based/serverless application 102 to outsource security-related operations to the central security controller 106 to reduce the complexities of including security features into each microservice/serverless function to perform the security-related operations. In addition, the use of the central security controller 106 to handle the security-related operations for the microservices/serverless functions 104 of the microservices-based/serverless application 102 allows the central security controller to gather important information and statistics regarding ingress and egress of data traffic for the microservices/serverless functions of the microservices-based/serverless application and to easily update and/or modify the security-related operations being handled by the central security controller. In some embodiments, the central security controller 106 may be viewed as part of the microservices-based/serverless application 102 and thus, is located within the same trust boundary of the microservices-based/serverless application.

The microservices-based/serverless application 102 can be any application that can run on any physical infrastructure and perform one or more operations or processes. As an example, the microservices-based/serverless application 102 may be an e-commerce application that takes customer orders and payment details and ships items to users. As shown in FIG. 1, the microservices-based/serverless application 102 is made up of the microservices/serverless functions 104, which perform tasks to execute the operations of the microservices-based/serverless application. The number of microservices/serverless functions 104 included in the microservices-based/serverless application 102 may vary depending on the architecture of the microservices-based/serverless application. Each microservice/serverless function 104 of the microservices-based/serverless application 102 is designed to perform at least one task that supports one or more operations of the microservices-based/serverless application. Examples of tasks that may be performed by the microservices/serverless functions 104 include tasks such as, ordering, inventory control, payment verification and shipping. These tasks may even be broken down further into microservices/serverless functions depending on the complexity that the task requires.

The microservices/serverless functions 104 of the microservices-based/serverless application 102 are separate computer programs, and may include one or more processing routines. As part of the microservices-based/serverless application 102, at least some of the microservices/serverless functions 104 may receive communications in the form of requests and/or data from external sources, such as users or other applications, including other microservices-based and/or serverless applications. In addition, the microservices/serverless functions 104 of the microservices-based/serverless application 102 may exchange communications between themselves to support one or more operations of the microservices-based/serverless application. These flows of data into the different microservices/serverless functions 104 of the microservices-based/serverless application 102 present security issues, which may need to be addressed by the microservices/serverless functions each time one of the microservices/serverless functions receives data. However, rather than each of the microservices/serverless functions 104 of the microservices-based/serverless application 102 being programmed or coded to internally handle these security issues, the microservices/serverless functions outsource security operations to the central security controller 106, which handles these security issues for some or all of the microservices/serverless functions, as explained below.

The microservices/serverless functions 104 may be coded using any computer programming language. As an example, the microservice/serverless function 104A may be written in Go programming language, the microservice/serverless function 104B may be written in Java programming language, and microservice/serverless function 104C may be written in C programming language. Thus, if security features, such as authorization, authentication and data sanitization, are to be added to each of these microservices/serverless functions, such security features would have to be written or coded in the same computer programming language of that microservice/serverless function. However, the microservices/serverless functions 104 of the microservices-based/serverless application 102 do not include such security features. Rather, these security features or functionalities are outsourced to the central security controller 106 and accessed by sending security requests to the central security controller and receiving security responses back from the central security controller. Thus, there is no need to code these security features into each of these microservices/serverless functions 104 using the different computer programming languages as defined by the computer programming languages used to code the microservices/serverless functions.

Figure 2:
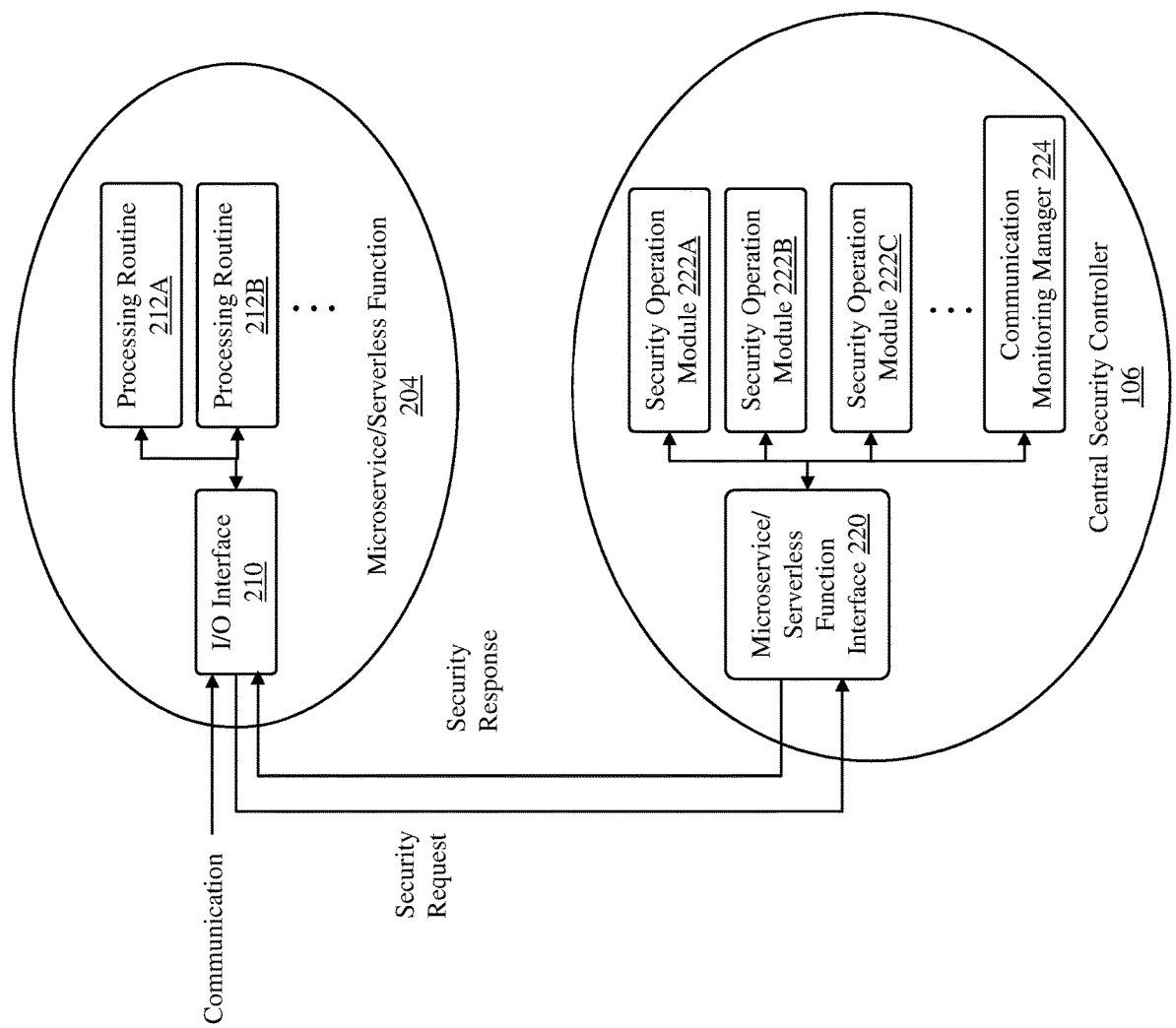
FIG. 2 is a block diagram of a representative microservice/serverless function of a microservices-based/serverless application and a central security controller of the application system in accordance with an embodiment of the invention.

Turning now to FIG. 2, a microservice/serverless function 204 that is a representative of the microservices/serverless functions 104 of the microservices-based/serverless application 102 in accordance with an embodiment of the invention is shown. As illustrated in FIG. 2, the microservice/serverless function 204 includes an input/output (I/O) interface 210 and one or more processing routines 212A and 212B. The I/O interface 210 operates to receive communications from external sources and/or from other microservices/serverless functions 104 of the microservices-based/serverless application 102. In addition, the I/O interface 210 may receive security responses from the central security controller 106. When a communication is received, the I/O interface 210 examines the received communication to determine whether one or more security operations are required for the received communication. If security operations are not needed for the received communication, the received data is sent to one or more appropriate processing routines 212 in the microservice/serverless function 204 by the I/O interface 210. The received communication is then consumed or used by those processing routines to execute tasks. However, if security operations are needed for the received communication, the received communication or some information contained in the communication is sent to the central security controller 106 as a security request by the I/O interface 210 so that one or more security operations can be performed with respect to the received communication. In response, the results of the security operations performed by the central security controller 106 are then transmitted back to the microservice/serverless function 204 as security responses, which are received by the I/O interface 210 of the microservice/serverless function 204. Depending on the results, the received communication or some information contained in the communication is sent to one or more appropriate processing routines 212 in the microservice/serverless function 204 by the I/O interface 210 to be consumed or used by those processing routines.

In an embodiment, the I/O interface 210 may use an application programming interface (API) provided by the central security controller 106 to request one or more security operations to be performed by the central security controller 106 with respect to a particular communication and to receive the results of the security operations from the central security controller. In an embodiment, the I/O interface 210 may make a Representational State Transfer (REST) API call to the central security controller 106 for one or more security operations to be executed with respect to the communication in order to receive a response, which would be the results of the security operations. As an example, the I/O interface 210 may make a REST API call for data/input validation for a received communication. In response to the API call, the central security controller 106 will execute a validation operation on the communication or some information or data string contained in the communication. The result of the authentication operation may either be "successful" or "unsuccessful". The particular result of the authentication operation is then transmitted back to the I/O interface 210 of the microservice/serverless function 204. As another example, the I/O interface 210 may make a REST API call for sanitization of data in a received communication. In response to the API call, the central security controller 106 will execute a data sanitization operation on the communication or some information or data string contained in the communication. The result of the sanitization operation may either be "successful" with sanitized data, e.g., a sanitized version of a received data string, or "unsuccessful". The particular result of the data sanitization operation is then transmitted back to the I/O interface 210 of the microservice/serverless function 204.

Each processing routine 212 of the microservice/serverless function 204 operates to perform one or more tasks to support the operation of the microservice/serverless function 204. The tasks performed by the processing routines 212 of the microservice/serverless function 204 will vary depending on their functionalities with respect to the overall operation of the microservice/serverless function 204. As an example, the processing routines may be configured or programmed to take user supplied data in an order form. Since each input communication that requires one or more security resolutions is first processed by the central security controller 106, any input communication that is transmitted to the processing routines 212 for processing by the I/O interface 210 can be assured that any security issues have been properly resolved.

Also illustrated in FIG. 2 are components of the central security controller 106 in accordance with an embodiment of the invention. As shown in FIG. 2, the central security controller 106 includes a microservice/serverless function interface 220, a number of security operation modules 222A, 222B and 222C and a communication monitoring manager 224. The microservice/serverless function interface 220 operates to interface with the microservice/serverless function 204, as well as other microservices/serverless functions 104 of the microservices-based/serverless application 102, to receive requests for security operations to be performed at the central security controller 106 for the microservices/serverless functions and to transmit the results of the security operations back to the requesting microservices/serverless functions. In an embodiment, the microservice/serverless function interface 220 is an API that processes API calls from the microservices/serverless functions. Depending on the API calls, the microservice/serverless function interface 220 will invoke the appropriate security operation modules 222 so that the desired security operations can be performed by those security operation modules in response to the API calls. In some embodiments, the central security controller 106 may be implemented as a microservice/serverless function or a microservices-based/serverless application.

Each of the security operation modules 222 of the central security controller 106 operates to execute a particular security operation. In the illustrated embodiment, the security operation module 222A may be configured or programmed to perform an authorization operation, the security operation module 222B may be configured or programmed to perform a data validation operation, and the security operation module 222C may be configured or programmed to perform a data sanitization operation. However, in other embodiments, the central security controller 106 may include additional security operation modules that may be configured to perform other security-related operations that are required to be executed for at least some of the microservices/serverless functions 104 of the microservices-based/serverless application 102, such as data authentication and output encoding. In some embodiments, there may be multiple security operation modules in the central security controller 106 that perform the same security operation, e.g., a data sanitization operation, so that the central security controller can process multiple requests for the data sanitization operation from multiple microservices/serverless functions 104 of the microservices-based/serverless application 102.

The security operation modules 222 of the central security controller 106 may perform their respective security operations using any known algorithms. Since the security operation modules 222 that perform these various security operations are not part of any microservice/serverless function 104 of the microservices-based/serverless application 102, the security operation modules do not have to be written in the same computer programming language as the microservices/serverless functions of the microservices-based/serverless application. Furthermore, since the security operation modules 222 of the central security controller 106 remotely handle the security operations for the microservices/serverless functions 104 of the microservices-based/serverless application 102, any changes to the security operations can be easily implemented by modifying the security operation modules, including replacing one or more of the security operation modules and/or adding or deleting one or more security operation modules. Thus, a particular security operation for the microservices/serverless functions of the microservices-based/serverless application, such as a data sanitization operation, can be easily updated or revised by modifying the security operation module that performs that security operation.

The results of the security operations performed by the security operation modules 222 of the central security controller 106 are returned to the requesting microservices/serverless functions 104 of the microservices-based/serverless application 102 as security responses. The following is a pseudo code example of possible API responses for a data validation operation performed by the security operation module 222B of the central security controller 106:

```
Method: GET
Response when successful:
{
    "response": {
        "code": 200,
        "message": "OK"
    },
    "data": {
```

```
        "usage 1": "true",
        "usage 2": "false",
        ...
        "usage n": "true"
    }
}
Response when failed:
{
    "response": {
        "code": 400,
        "message": "Unable to verify the input string!"
    },
    "data": ""
}
```

The following is a pseudo code example of possible API responses for a data sanitization operation performed by the security operation module 222C of the central security controller 106:

```
Method: GET
Response when successful:
{
    "response": {
        "code": 200,
        "message": "OK"
    },
    "data": "Sanitized String"
}
Response when failed:
{
    "response": {
        "code": 400,
        "message": "Unable to sanitize the input string!"
    },
    "data": ""
}
```

The communication monitoring controller 224 of the central security controller 106 operates to monitor the microservice/serverless function interface 220 and the security operation modules 222 to collect metrics regarding the communication traffic to and from the microservices/serverless functions 104 of the microservices-based/serverless application 102. Thus, the communication monitoring controller 224 may collect information regarding payloads of the communications that are received by the microservices/serverless functions 104 to determine the type of information being transmitted to the microservices/serverless functions. The communication monitoring controller 224 may also collect metrics regarding data that have been sanitized and data that were unable to be sanitized. The collected information can then be used to improve some of the security operations being performed by the security operation modules 222 of the central security controller 106.

Figure 3:
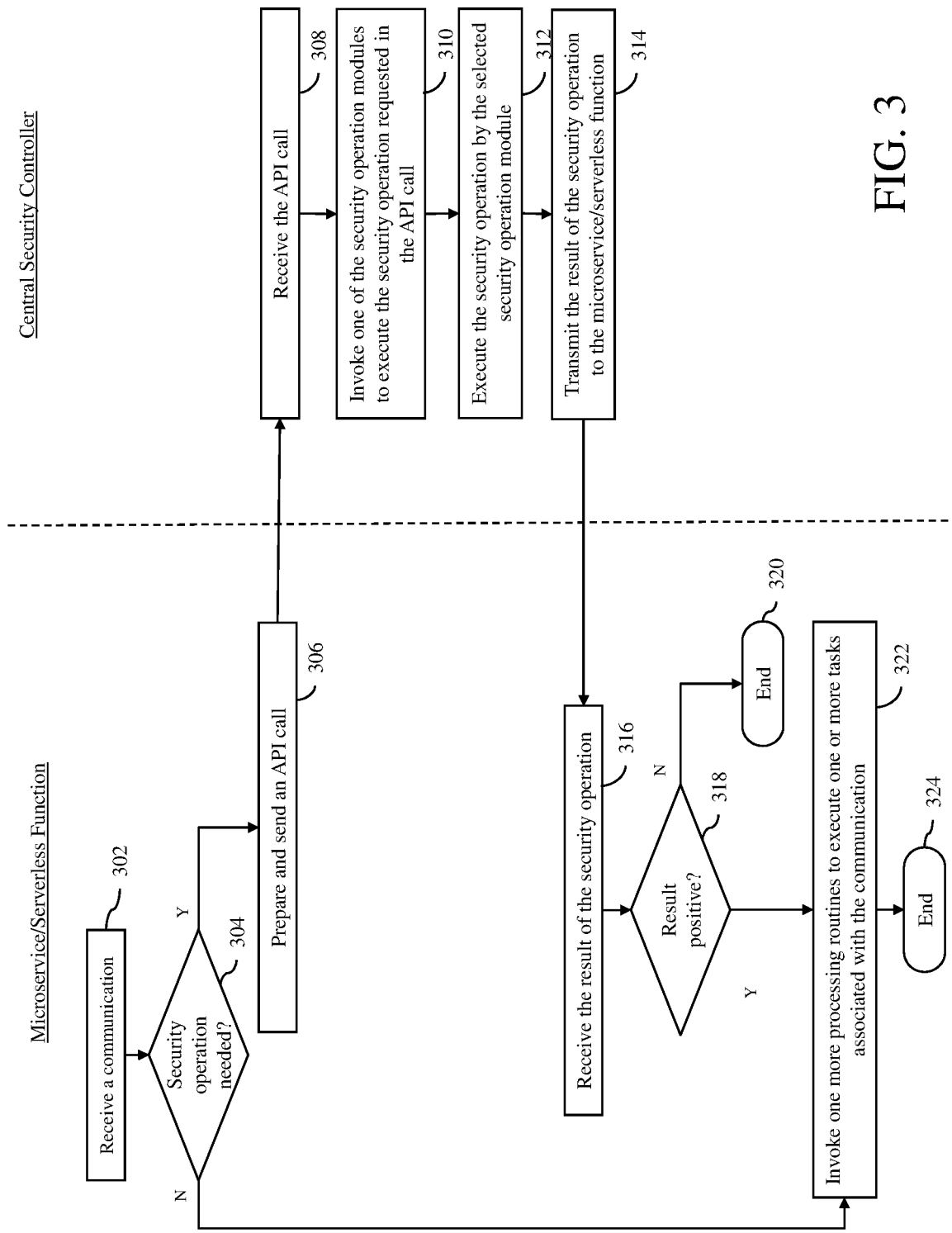
FIG. 3 is a swimlane diagram of an operation of the application system in accordance with an embodiment of the invention.

The operation of the application system 100 in accordance with an embodiment of the invention is described with reference to a swimlane flowchart of FIG. 3 using the microservice/serverless function 204 and the central security controller 106 illustrated in FIG. 2. The operation begins at block 302, where a communication is received at the I/O interface 210 of the microservice/serverless function 204. The communication may be from a source external to the microservices-based/serverless application 102 or from another microservice/serverless function 104 of the microservices-based/serverless application 102. Depending on the communication, there may be a need for one or more security operations to be performed with respect to the communication, such as authorization, data validation and/ or data sanitization. As an example, the communication may include source identification, credentials, and untrusted user controlled data.

Next, at block 304, a determination is made by the I/O interface 210 of the microservice/serverless function 204 whether the received communication requires a security operation to be performed. If it is determined that no security operation needs to be performed, then the operation proceeds to block 322, where one or more of the processing routines 212 of the microservice/serverless function 204 are invoked by the I/O interface 210 to execute one or more tasks associated with or specified in the communication.

However, if it is determined that a security operation needs to be performed, at block 304, then the operation proceeds to block 306, where an API call for the needed security operation is prepared and transmitted to the central security controller 106 by the I/O interface 210 of the microservice/serverless function 204. In an embodiment, the API call may include at least some data extracted from the communication, such as source identification, credentials and other information.

At block 308, the API call is received by the microservice/serverless function interface 220 of the central security controller 106. Next, at block 310, one of the security operation modules 222 is invoked by the microservice/serverless function interface 220 to execute the security operation requested in the API call. In the illustrated example of FIG. 2, if an authorization operation is requested, the security operation module 222A may be invoked, if a data validation operation is requested, the security operation module 222B may be invoked, or if a data sanitization operation is requested, the security operation module 222C may be invoked.

Next, at block 312, the requested security operation is executed by the selected security operation module. In an embodiment, the requested security operation may be executed by the selected security operation module using a known algorithm or methodology. Next, at block 314, the result of the executed security operation is transmitted from the central security controller 106 back to the microservice/serverless function 204, which initiated the API call. In particular, the result is transmitted from the microservice/serverless function interface 220 of the central security controller 106 to the I/O interface 210 of the microservice/serverless function 204.

Next, at block 316, the result of the executed security operation is received at the I/O interface 210 of the microservice/serverless function 204. Next, at block 318, a determination is made by the I/O interface 210 whether the result of the executed security operation is positive or successful. As an example, if the executed security operation is an authorization operation, then the result of the executed security operation may simply be either "authorized", which would indicate that the operation was successful, or "not authorized", which would indicate that the operation was not successful. As another example, if the executed security operation is a data sanitization operation, then the result of the executed security operation may indicate either "sanitized", which would indicate that the operation was successful, or "unable to sanitize", which would indicate that the operation was not successful.

If the result of the executed security operation is not positive or successful, then the operation proceeds to block 320, where the operation comes to an end. In some embodiments, an error or failure message may be generated by the microservice/serverless function 204, which may be transmitted back to the source of the communication.

However, if the result of the executed security operation is positive or successful, then the operation proceeds to block 322, where one or more of the processing routines 212 of the microservice/serverless function 204 are invoked by the I/O interface 210 to execute one or more tasks associated with or specified in the communication. The operation then comes to an end, at block 324.

Although the central security controller 106 of the application system 100 has been described as performing security applications for a single microservices-based/serverless application, in other embodiments, the central security controller may support multiple microservices-based and/or serverless applications. Thus, in these embodiments, the central security controller 106 may perform security operations for microservices/serverless functions of different microservices-based/serverless applications.

The application system 100 may be implemented in any physical computing infrastructure, which may include host computers or servers running virtual computing instances (VCIs), such as virtual machines (VMs) or virtual containers to support the microservices-based/serverless application. A virtual machine is an emulation of a computer system in the form of a software computer that, like a physical computer, can run an operating system and applications. A virtual machine may be comprised of a set of specification and configuration files and is backed by the physical resources of a physical host computer. Every virtual machine may have virtual devices that provide the same functionality as physical hardware and have additional benefits in terms of portability, manageability, and security. An example of a virtual machine is the virtual machine created using VMware vSphere® solution made commercially available from VMware, Inc of Palo Alto, Calif. A virtual container is a package that relies on virtual isolation to deploy and run applications that access a shared operating system (OS) kernel. An example of a virtual container is the virtual container created using a Docker engine made available by Docker, Inc.

Figure 4:
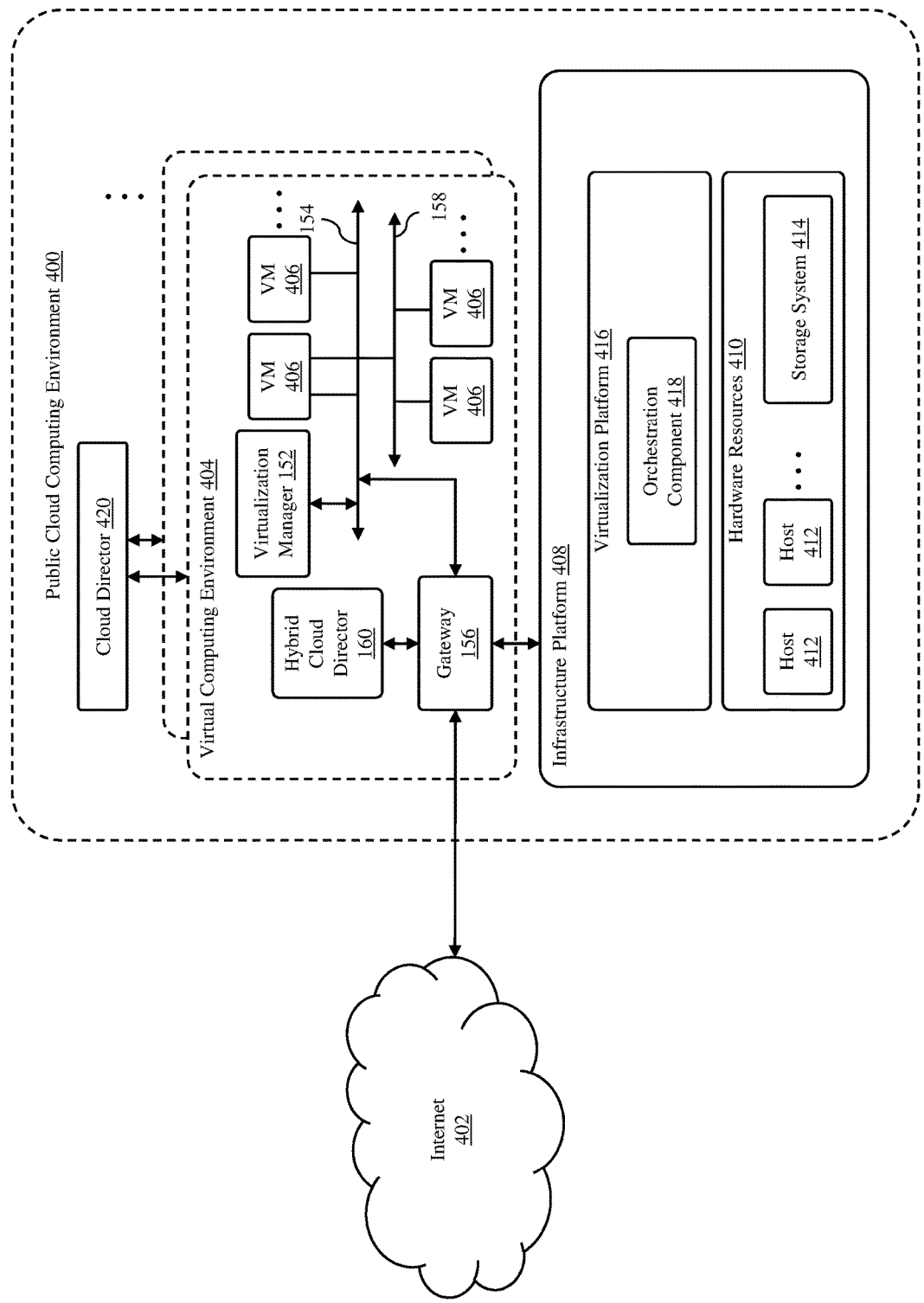
FIG. 4 is a block diagram of a public cloud computing environment in which the application system of FIG. 1 can be implemented in accordance with an embodiment of the invention.

Turning now to FIG. 4, a block diagram of a public cloud computing environment 400 that can be used to implement the microservices-based/serverless application 102 and the central security controller 106 in accordance with an embodiment of the invention is shown. The public cloud computing environment 400 may be operated by a cloud computing service provider and exposed as a service available to account holders, such as enterprises, which can be access via the Internet 402.

The public cloud computing environment 400 is configured to dynamically provide an enterprise (or users of an enterprise) with physical resources to execute microservices-based/serverless applications. These resources may be provided using one or more virtual computing environments 404 in which virtual machines 406 are running to execute the microservices-based/serverless applications. The public cloud computing environment 400 includes an infrastructure platform 408 upon which the virtual computing environments can be executed. In the particular embodiment of FIG. 4, the infrastructure platform 408 includes hardware resources 410 having computing resources (e.g., host computers 412), storage resources (e.g., one or more storage systems, such as a storage area network (SAN) 414), and networking resources (not illustrated), and a virtualization platform 416, which is programmed and/or configured to provide the virtual computing environments 404 that support the virtual machines 406 running in the host computers 412. The virtualization platform 416 may be implemented using one or more software programs that reside and execute in one or more computer systems, such as the host computers 412, or in one or more virtual machines 406 running on the host computers.

In one embodiment, the virtualization platform 416 includes an orchestration component 418 that provides infrastructure resources to the virtual computing environments 404 responsive to provisioning requests. The orchestration component may instantiate virtual machines according to a requested template that defines one or more virtual machines having specified virtual computing resources (e.g., compute, networking and storage resources). Further, the orchestration component 418 may monitor the infrastructure resource consumption levels and requirements of the virtual computing environments 404 and provide additional infrastructure resources to the virtual computing environments as needed or desired. In one example, the virtualization platform 416 may be implemented by running on the hosts 412 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 400.

In one embodiment, the public cloud computing environment 400 may include a cloud director 420 that manages allocation of virtual computing resources to an enterprise. The cloud director may be accessible to users via a REST API or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 418 to instantiate the virtual machines (e.g., the virtual machines 406) as needed. One example of the cloud director is the VMware vCloud Director® product from VMware, Inc. The public cloud computing environment 400 may be VMware cloud (VMC) on Amazon Web Services (AWS).

In one embodiment, at least some of the virtual computing environments 404 may be configured as virtual data centers. Each virtual computing environment includes one or more virtual computing instances, such as the virtual machines 406, and one or more virtualization managers 422. One example of the virtualization manager 422 is the VMware vCenter Server® product made available from VMware, Inc. Each virtual computing environment may further include one or more virtual networks 424 used to communicate between the virtual machines 406 running in that environment and managed by at least one networking gateway device 426, as well as one or more isolated internal networks 428 not connected to the gateway device 426. The gateway device 426, which may be a virtual appliance, is configured to provide the virtual machines 406 and other components in the virtual computing environment 404 with connectivity to external devices.

In one embodiment, each virtual computing environments 404 includes a hybrid cloud director 430 configured to communicate with a corresponding hybrid cloud manager in a private cloud computing environment (not shown) to enable a common virtualized computing platform between the private and public cloud computing environments. The hybrid cloud director may communicate with the hybrid cloud manager in the private cloud computing environment using Internet-based traffic via a VPN tunnel established through the gateway. As an example, the hybrid cloud director 430 may be a component of the HCX-Cloud product, which is provided by VMware, Inc.

Figure 5:
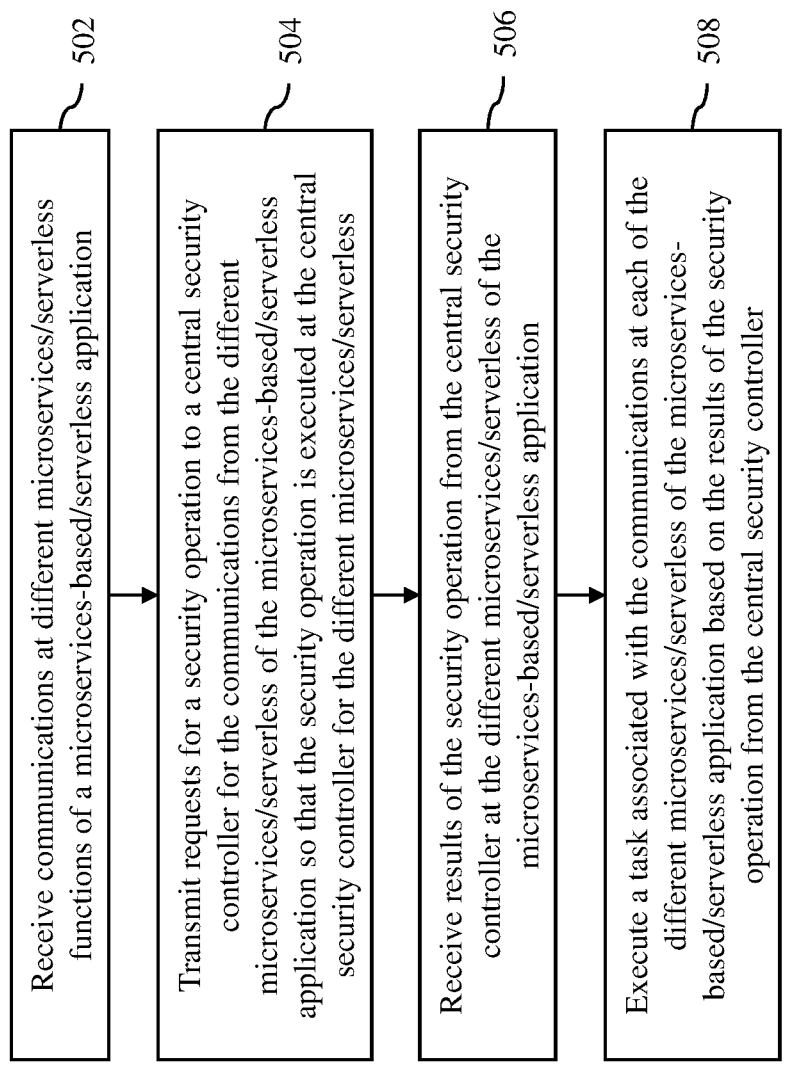
FIG. 5 is a flow diagram of a method for executing a security operation for microservices/functions of a microservices-based/serverless application running on a physical infrastructure in accordance with an embodiment of the invention.

A computer-implemented method for executing a security operation for microservices/serverless functions of a microservices-based/serverless application running on a physical infrastructure in accordance with an embodiment of the invention is described with reference to a flow diagram of FIG. 5. At block 502, communications are received at different microservices/serverless functions of the microservices-based/serverless application. At block 504, requests for the security operation are transmitted to a central security controller for the communications from the different microservices/serverless functions of the microservices-based/serverless application so that the security operation is executed at the central security controller for the different microservices/serverless functions. At block 506, results of the security operation from the central security controller are received at the different microservices/serverless functions of the microservices-based/serverless application. At block 508, a task associated with the communications is executed at the different microservices/serverless functions of the microservices-based/serverless application based on the results of the security operation from the central security controller. As an example, if the result is not positive for a particular microservice/serverless function, no task associated with the communication for the particular microservice/serverless function is performed. However, if the result is positive for the particular microservice/serverless function, at least one task associated with the communication for the particular microservice/serverless function is performed at that microservice/serverless function.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for executing a security operation for microservices/serverless functions of a microservices-based/serverless application running on a physical infrastructure, the method comprising:

receiving communications at different microservices/serverless functions of the microservices-based/serverless application;

at each of the different microservices/serverless functions, determining whether a received communication requires a security operation to be performed, wherein the security operation is one of an authorization operation, a data validation operation and a data sanitization operation;

for the received communications at the different microservices/serverless functions that require the security operation to be performed, transmitting requests for the security operation from the different microservices/serverless functions of the microservices-based/serverless application to a central security controller for the received communications so that the security operation is executed at the central security controller for the different microservices/serverless functions;

receiving results of the security operation from the central security controller at the different microservices/serverless functions of the microservices-based/serverless application; and executing a task associated with the communications at the different microservices/serverless functions of the microservices-based/serverless application based on the results of the security operation from the central security controller.

2. The method of claim 1, wherein the different microservices/serverless functions are coded using different computer programming languages.

3. The method of claim 1, wherein each of the different microservices/serverless functions is not programmed to execute the security operation.

4. The method of claim 1, wherein the requests for the security operation are application programming interface (API) calls for the security operation.

5. The method of claim 1, further comprising, for the received communications at particular microservices/serverless functions that do not require the security operation to be performed, executing a task associated with the communications at the particular microservices/serverless functions of the microservices-based/serverless application without transmitting any requests for the security operation from the particular microservices/serverless functions of the microservices-based/serverless application to the central security controller.

6. The method of claim 1, further comprising executing the security operation at the central security controller in response to each of the requests to produce the results of the security operation.

7. The method of claim 1, further comprising monitoring data in the central security controller to collect data traffic information regarding the different microservices/serverless functions of the microservices-based/serverless application.

8. A non-transitory computer-readable storage medium containing program instructions for a method for executing a security operation for microservices/serverless functions of a microservices-based/serverless application running on a physical infrastructure, wherein execution of the program instructions by one or more processors of a computer system causes the one or more processors to perform steps comprising:

receiving communications at different microservices/serverless functions of the microservices-based/serverless application;

at each of the different microservices/serverless functions, determining whether a received communication requires a security operation to be performed, wherein the security operation is one of an authorization operation, a data validation operation and a data sanitization operation;

for the received communications at the different microservices/serverless functions that require the security operation to be performed, transmitting requests for the security operation from the different microservices/serverless functions of the microservices-based/serverless application to a central security controller for the received communications so that the security operation is executed at the central security controller for the different microservices/serverless functions;

receiving results of the security operation from the central security controller at the different microservices of the microservices-based/serverless application; and executing a task associated with the communications at the different microservices/serverless functions of the microservices-based/serverless application based on the results of the security operation from the central security controller.

9. The computer-readable storage medium of claim 8, wherein the different microservices/serverless functions are coded using different computer programming languages.

10. The computer-readable storage medium of claim 8, wherein each of the different microservices/serverless functions is not programmed to execute the security operation.

11. The computer-readable storage medium of claim 8, wherein the requests for the security operation are application programming interface (API) calls for the security operation.

12. The computer-readable storage medium of claim 8, wherein the steps further comprise, for the received communications at particular microservices/serverless functions that do not require the security operation to be performed, executing a task associated with the communications at the particular microservices/serverless functions of the microservices-based/serverless application without transmitting any requests for the security operation from the particular microservices/serverless functions of the microservices-based/serverless application to the central security controller.

13. The computer-readable storage medium of claim 8, wherein the steps further comprise executing the security operation at the central security controller in response to each of the requests to produce the results of the security operation.

14. The computer-readable storage medium of claim 8, wherein the steps further comprise monitoring data in the central security controller to collect data traffic information regarding the different microservices/serverless functions of the microservices-based/serverless application.

15. A system comprising:
memory; and
at least one processor configured to:
receive communications at different microservices/serverless functions of a microservices-based/serverless application;

at each of the different microservices/serverless functions, determine whether a received communication requires a security operation to be performed, wherein the security operation is one of an authorization operation, a data validation operation and a data sanitization operation;

for the received communications at the different microservices/serverless functions that require the security operation to be performed, transmit requests for a security operation from the different microservices/serverless functions of the microservices-based/serverless application to a central security controller for the received communications so that the security operation is executed at the central security controller for the different microservices/serverless functions;

receive results of the security operation from the central security controller at the different microservices/serverless functions of the microservices-based/serverless application; and execute a task associated with the communications at the different microservices/serverless functions of the microservices-based/serverless application based on the results of the security operation from the central security controller.

16. The system of claim 15, wherein the different microservices/serverless functions are coded using different computer programming languages.

17. The system of claim 15, wherein each of the different microservices/serverless functions is not programmed to execute the security operation.

18. The system of claim 15, wherein the requests for the security operation are application programming interface (API) calls for the security operation.

19. The system of claim 15, wherein the at least one processor is configured to, for the received communications at particular microservices/serverless functions that do not require the security operation to be performed, execute a task associated with the communications at the particular microservices/serverless functions of the microservices-based/serverless application without transmitting any requests for the security operation from the particular microservices/serverless functions of the microservices-based/serverless application to the central security controller.

20. The system of claim 15, wherein the at least one processor is configured to execute the security operation at the central security controller in response to each of the requests to produce the results of the security operation.

\* \* \* \* \*